G. C. HANNA.
PNEUMATICALLY TIRED WHEEL.
APPLICATION FILED OCT. 13, 1916.
1,243,515.
Patented Oct. 16, 1917.
2 SHEETS—SHEET 1.
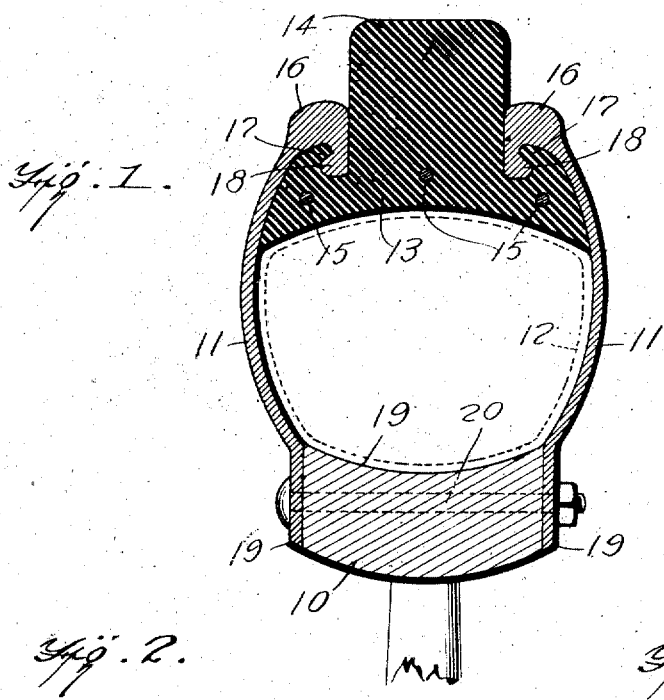
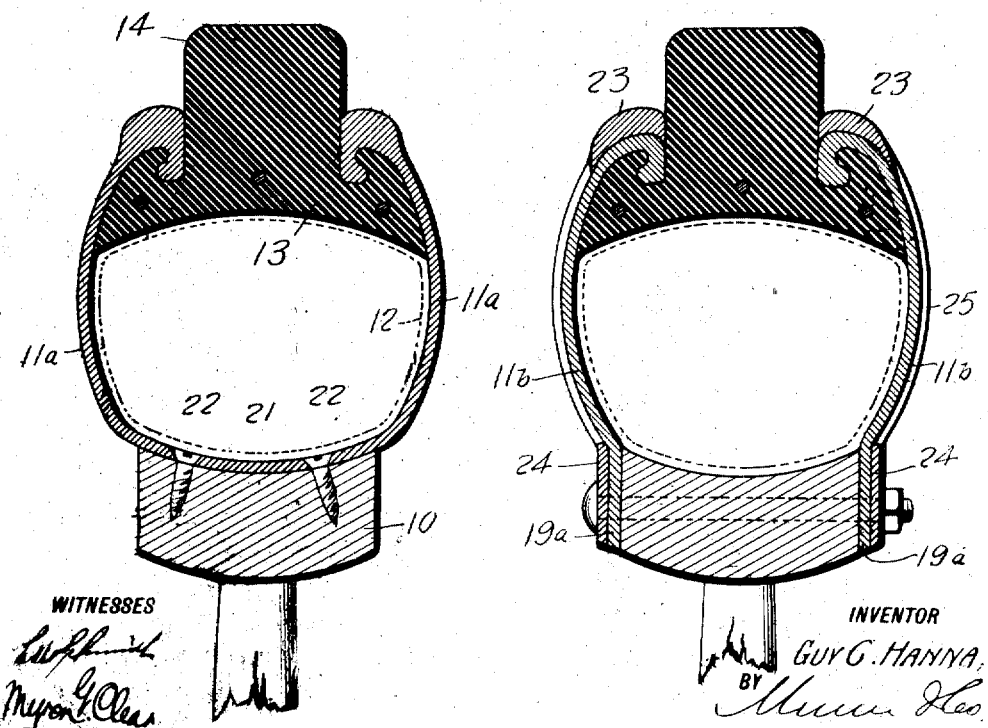
WITNESSES
INVENTOR
Guy C. Hanna,
BY
ATTORNEYS

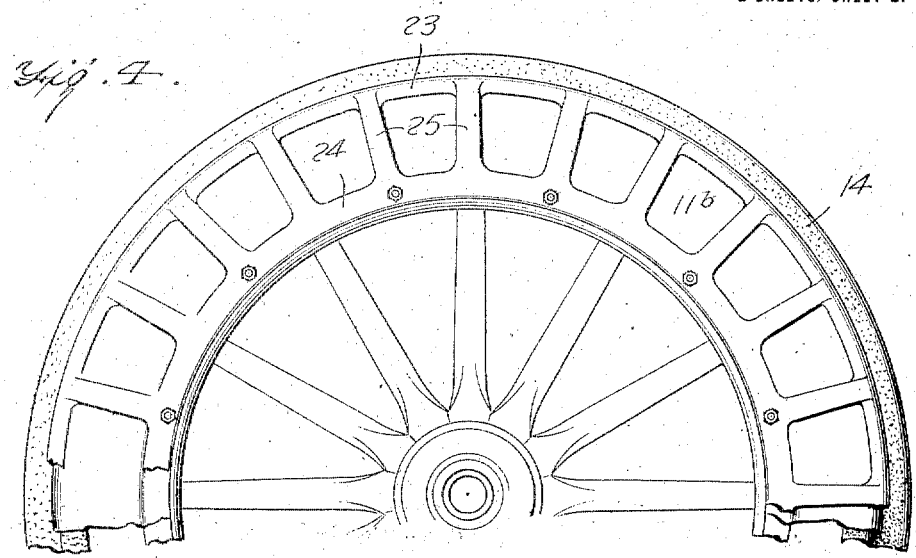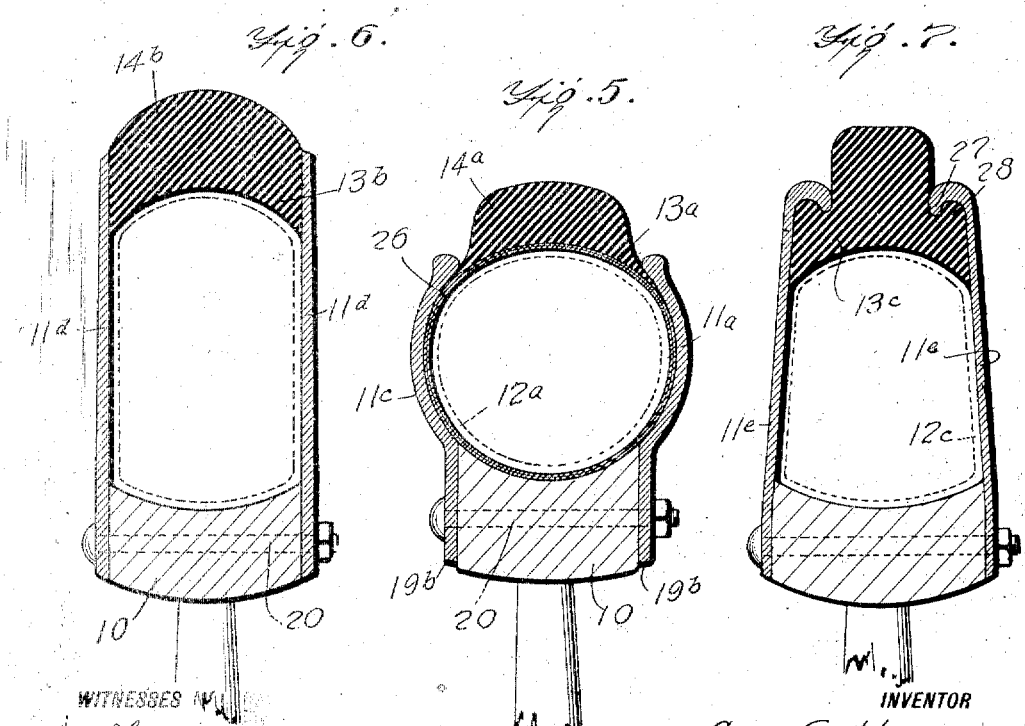

UNITED STATES PATENT OFFICE.

GUY C. HANNA, OF PLAINFIELD, INDIANA.

PNEUMATICALLY-TIRED WHEEL.

1,243,515.  Specification of Letters Patent.  Patented Oct. 16, 1917.

Application filed October 13, 1916. Serial No. 125,454.

*To all whom it may concern:*

Be it known that I, GUY C. HANNA, a citizen of the United States, and a resident of Plainfield, in the county of Hendricks and State of Indiana, have invented a new and useful Improvement in Pneumatically-Tired Wheels, of which the following is a specification.

My present invention relates generally to pneumatically tired wheels, and more particularly to a combined tire and rim construction, the parts of which coöperate in such manner as to minimize the usual danger of puncture and provide means by which the tire may be protected in deflated condition and by which the wheel may remain in use without danger of pinching or splitting the tire as at present.

In the accompanying drawings illustrating several constructions by which my invention may be carried out and which form a part of this specification, Figure 1 is a radial section through a rim and tire construction embodying my invention, Fig. 2 is a similar view through a slightly modified form, Fig. 3 is a similar view through another modified form, Fig. 4 is a partial side elevation of the form of my invention illustrated in Fig. 3, Fig. 5 is a view similar to Figs. 1 to 3 inclusive, illustrating another modified form, and Figs. 6 and 7 are similar views illustrating still other modified forms.

Referring now to Fig. 1 my invention contemplates the use of a rim 10 of suitable construction, carrying side plates 11, each of which extends annularly around the entire circumference of the rim and projects materially therebeyond in an outward direction, the plates 11 being in spaced relation to receive therebetween the tire including an inner inflatable tube 12 and a shoe 13, the latter of which is provided with a central annular enlargement 14 normally projecting exteriorly between the outer edges of the rim plates 11, and is of solid construction with or without internal reinforcements in the nature of embedded rings 15.

The tube 12 of the tire is confined between the side plates 11 and between the outer periphery of the rim 10 and the inner periphery of the shoe 13, and when inflated as normal, operates to hold the shoe 13 in its outer position, with its portion 14 projecting beyond the outer edges of the side plates 11 to form the traction surface.

Should tube 12 become deflated for any reason it is obvious that it will be prevented from destructive pinching due to the outer edges 16 of the side plates 11, inwardly between which the projecting portion 14 of the shoe 13 is movable when the tube 12 is deflated, which form the tractive surface of the wheel.

The shoe 13 of the tire and the outer portions of the side plates 11 are preferably provided with internally engaging ribs 17 and 18 which engage, when the tube 12 is inflated, to prevent the tube from blowing out between the shoe 13 and side plates 11, due to the internal pressure of the inflated tube 12 laterally against the said side plates 11.

As seen in Fig. 1 the side plates 11 have inner annular flanges 19 at the sides of the rim 10, providing for connection of the side plates to the rim 10 by bolts 20 extending laterally through the rim at spaced points therearound and at the same time providing for ready removal of one of the side plates 11, in order that access may be had to the tube 12 for purposes of repair or substitution.

As seen in Fig. 2 however, in which the tire including its tube 12 and shoe 13 with its exteriorly projecting portion 14 are similar to the same parts in Fig. 1, the side plates 11ª are formed integral with one another, their integral connecting portion 21 being secured to the periphery of the rim 10 by means of suitable fastening members 22.

As seen in Fig. 3, the side plates 11ᵇ are reinforced at their outer edges by annular rings 23 around said edges, in case the side plates are made of any material other than that capable of holding them rigid in case of deflation of the tire, the supplemental rings 23 being integral with annular rings 24 by means of spaced connecting webs 25, the rings 24 being arranged along the outer faces of the inner flanges 19ª of the side plates, and the connecting webs 25 extending radially from the inner rings 24 to the outer rings 23, as best seen by reference to Fig. 4.

As seen in Fig. 5, the side plates 11ᶜ, with inner flanges 19ᵇ, connected to the sides of the rim 10 by the bolts 20, receive a shoe 13ª, the portion 14ª of which projects between and beyond the outer edges of the side plates 11ᶜ and is preferably formed of rubber attached to a canvas or other fabric tube 26, which latter receives the inner inflatable tube 12ª, thus dispensing with the necessity of the clenching ribs 17 and 18 in the forms of the invention shown in Figs. 1 to 4 inclusive.

In Fig. 6 the side plates 11ᵈ are straight, the inner portions thereof being bolted by the bolts 20 to the rim 10 and the outer portions of which are in spaced parallel relation to receive between the inner portions thereof an inflatable tube 12ᵇ and a shoe 13ᵇ, the peripheral portion 14ᵇ of which projects beyond the extreme outer edges of the plates 11ᵈ so as to normally form the tractive surface.

In the form of the invention shown in Fig. 7, the construction is similar to that of Fig. 6, except that the straight side plates 11ᵉ are inclined toward one another in an outward direction and their outer edges are inturned so that they not only form the tractive surface when the inner tube 12ᶜ is deflated, but also provide inturned edges 27 engaging the ribs 28 of the shoe 13ᶜ when the tube 12ᶜ is inflated, so as to prevent danger of blowouts, substantially as do the clencher ribs 17 and 18 of the forms of the invention seen in Figs. 1 to 4 inclusive.

It is obvious, however, and in accordance with any of the preceding forms, the pneumatic tire when deflated is protected against pinching and splitting during what is known as riding on the rim at the present time, by virtue of the outer portions of the side plates, the outer edges of which form the traction surface of the wheel when the tire is deflated.

It is likewise obvious that with my improved construction the pneumatic tire or rather the inflatable tube thereof, is effectively protected from blowouts and punctures as well as from side abrasions against curbing, nearby vehicles and other obstructions engaging the side of the wheel.

I claim:—

1. In a device of the character described, the combination of the wheel rim, spaced side members secured to and extending around the rim, each of which is of integral formation and consists of inner and outer annular rings and radial connecting webs of which the inner ring is secured to said rim, with open spaces between the webs around and between said rings, and a pneumatic tire around the rim between the side members including a portion normally projecting exteriorly beyond the outer rings of the said side members to cushion the wheel, said tire being movable inwardly beyond said outer rings in use when the tire is deflated, the outer rings of the said side members forming the traction surface of the wheel when the tire is deflated and the said exteriorly projecting portion of the tire moves inwardly beyond said rings.

2. In a device of the character described, the combination with a wheel rim, spaced side pieces secured to and extending around the rim, each having inwardly extending annular tire engaging means around the outer edge thereof, a pneumatic tire around the rim between the said side pieces and including a portion normally projecting exteriorly between the said tire engaging means thereof to cushion the wheel, said portion of said tire being movable inwardly beyond the outer edges of the side pieces when the tire is deflated, and spaced side reinforcing members disposed exteriorly of the said side pieces to reinforce the latter, having inner and outer rings, the former of which are secured to the rim and the latter of which extend over the tire engaging portions of the side pieces, and webs connecting the said inner and outer rings of the said side members, said outer rings of said side pieces forming the traction surface of the wheel when the tire is deflated and its said projecting portion moves inwardly of the side pieces.

GUY C. HANNA.